US008522831B2

(12) United States Patent
Vianello

(10) Patent No.: US 8,522,831 B2
(45) Date of Patent: Sep. 3, 2013

(54) AUTOMATIC DEVICE FOR FILLING INSULATING GLAZING UNITS AND METHOD THEREFOR

(75) Inventor: Fortunato Vianello, Vallio (IT)

(73) Assignee: FOR.EL. Base di Davanzo Nadia & C. S.N.C., Roncade, Frazione Vallio (IT)

( * ) Notice: Subject to any disclaimer, the term of this patent is extended or adjusted under 35 U.S.C. 154(b) by 507 days.

(21) Appl. No.: 12/379,262

(22) Filed: Feb. 18, 2009

(65) Prior Publication Data

US 2009/0205743 A1 Aug. 20, 2009

(30) Foreign Application Priority Data

Feb. 20, 2008 (IT) .............................. TV2008A0031

(51) Int. Cl.
*B65B 31/04* (2006.01)
*C03B 35/00* (2006.01)

(52) U.S. Cl.
USPC .................. 141/4; 141/63; 141/66; 141/129; 141/163; 141/164; 141/165; 141/236; 156/109

(58) Field of Classification Search
USPC ............... 141/4, 66, 113, 163–165, 168, 171, 141/236, 287, 363, 365; 156/109
See application file for complete search history.

(56) References Cited

U.S. PATENT DOCUMENTS

| | | | | | |
|---|---|---|---|---|---|
| 4,356,614 | A | * | 11/1982 | Kauferle et al. | 29/469.5 |
| 5,762,739 | A | * | 6/1998 | Lenhardt et al. | 156/109 |
| 5,957,169 | A | * | 9/1999 | Trpkovski | 141/63 |
| 6,158,483 | A | * | 12/2000 | Trpkovski | 141/63 |
| 2007/0295441 | A1 | | 12/2007 | Schuler | |

FOREIGN PATENT DOCUMENTS

| | | | |
|---|---|---|---|
| EP | 0 674 085 | B1 | 5/1998 |
| EP | 0 674 087 | B1 | 5/1998 |
| EP | 0 674 086 | B2 | 8/2004 |
| WO | WO 2006/002975 | A1 | 1/2006 |

* cited by examiner

*Primary Examiner* — Timothy L Maust
*Assistant Examiner* — Timothy P Kelly
(74) *Attorney, Agent, or Firm* — Modiano & Associati; Albert Josif; Daniel J. O'Byrne

(57) ABSTRACT

A device and a method for filling with a gas other than air an insulating glazing unit composed of at least two glass panes and at least one spacer frame, comprising a movable and a fixed bed. The fixed bed is provided with retractable suckers suitable to capture a lower flap of a glass pane and move therewith with a motion of retraction with respect to the movable bed, such as to provide straightening of the lower flap of the glass pane.

11 Claims, 13 Drawing Sheets

AUTOMATIC DEVICE FOR FILLING INSULATING GLAZING UNITS AND METHOD THEREFOR

The present invention relates to an automatic device for filling insulating glazing units composed of at least two glass panes and at least one spacer frame with a gas other than air and to a method therefor.

BACKGROUND OF THE INVENTION

Currently it is known to deposit a spacer frame or a spacer profile on a glass pane and then mate the assembly thus formed to a second glass pane and seal it along the entire outer peripheral region so as to constitute the so-called insulating glazing unit or double glazing unit. The operation can also be a multiple one in order to obtain the insulating glazing unit constituted by three glass panes and two spacer frames or profiles, as well as n (4 or more) glass panes and n−1 spacer frames or profiles. The operation can also relate to glass panes that have different dimensions despite belonging to the same insulating glazing unit, so as to obtain an offset between their edges, which is necessary for mating with a particular type of door or window, i.e., the one that constitutes the so-called continuous glazing or so-called structural glazing. Frequently, the spacer frame or, more correctly, the profile that constitutes it, has a hollow rectangular transverse cross-section and is coated, on its sides that adhere to the glass panes, with a butyl sealant, and is also bevelled toward the outside of the double-glazing unit in order to accommodate a larger quantity of sealant. The spacer frame can also be constituted by a continuous profile made of expanded synthetic material which is coated, on its sides, with an acrylic adhesive and optionally with a butyl sealant.

Currently it is increasingly frequent to replace the air contained in the volume formed by the glass panes and by the spacer frame, a volume known as "chamber", with a gas having more effective thermal insulation characteristics than air. This is increasingly topical in view of the requirements of technical laws related to energy saving, and the present invention therefore arises specifically to solve some method- and device-related aspects that are inadequate according to the background art available up to now.

In order to better understand the configuration of the insulating glazing unit in the combination of its components, such as the glass panes and the spacer frame or spacer profile, some concepts related to the intermediate components themselves, i.e., the glass pane 2 and the spacer profile or frame 3, and the final product, i.e., the insulating glazing unit 1, are described in greater detail hereafter, with the assumption that the subsequent use of the insulating glazing unit, i.e., as a component of the door or window or of continuous glazing or structural glazing, is known.

In order to provide a more clear description, the final product will be described and then its forming components, with reference to FIGS. 1A-1I.

The insulating glazing unit 1 is constituted by the composition of two or more glass panes 2, which are separated by one or more spacer frames 3, which are generally hollow and finely perforated on the face that is directed inward; the spacer frames contain hygroscopic material 4 in their hollow part and are provided on the lateral faces with a butyl sealant 5 (which constitutes the so-called first seal) and the chamber (or chambers) delimited by the glass panes 2 and by the spacer frame (spacer frames) 3 are able to contain air or gas or mixtures of gases that give the double-glazing unit particular properties, for example thermally insulating and/or soundproofing properties. Recently, use has become widespread also of a spacer profile 3 that has a substantially rectangular cross-section and is made of expanded synthetic material (by way of non-limiting example: silicone and EPDM), which incorporates the hygroscopic material in its mass.

The joint between the glass panes 2 and the spacer frame (frames) 3 is achieved by means of two levels of sealing: the first one 5 is intended to provide tightness and initial bonding between such components and affects, i.e. is applied on, the lateral surfaces of the frame and the portions of the adjacent glazing units, already mentioned earlier; the second one 6 is intended to provide final cohesion among the components and mechanical strength of the joint among them and affects, i.e. is applied at, the compartment constituted by the outer surface of the spacer frame 3 and by the faces of the glass panes 2 up to their edge. In the case of a spacer profile 3 made of expanded synthetic material, the first level of sealing is replaced with, or integrated by, an adhesive material, for example an acrylic one, which is already spread onto the lateral faces of such spacer profile 3 and is covered by a removable protective film.

The glass panes 2 used in the composition of the insulating glazing unit 1 can have different configurations depending on the use of such unit: for example, the outer pane (outer with respect to the building) can be normal or reflective (to limit the heat input during summer months) or laminated/armored (for intrusion prevention/vandalism prevention functions) or laminated/tempered (for safety functions) or combined (for example reflective and laminated, to obtain a combination of properties); the inner pane (inner with respect to the building) can be normal or of the low-emissivity type (in order to limit the dispersion of heat during winter months) or laminated/tempered (for safety functions) or combined (for example of the low-emissivity type and laminated to obtain a combination of properties). In particular, the outer glass pane 2M can be larger than the inner one (ones) 2*m* along the entire extension of the perimeter or only on one side or only on some sides.

Among the types of glass pane referenced above, the so-called laminated, reinforced and tempered ones have the characteristic, or rather the problem, of not being sufficiently planar, and this makes filling with gas difficult, at least according to known methods.

The simple summary presented above makes it already evident that a manufacturing line for obtaining the insulating glazing unit product 1 requires many processes in sequence and in particular comprises filling with a gas other than air, to which the present application relates in detail, particularly to solve the drawback of the non-planarity of the glass panes that constitute the insulating glazing unit 1.

The processes for producing the insulating glazing unit 1, each requiring a corresponding and particular machine to be arranged in series with respect to the other complementary ones, are, by way of non-limiting example and at the same time not all necessary, the following:

- edging on the peripheral face of the pane to remove any coatings (generally of the type obtained with nanotechnology techniques) in order to allow and maintain over time the bond of the sealants;
- beveling of the sharp edges of the glass pane, both to eliminate edge defects introduced by the cutting operation and to reduce the risks of injury in subsequent handling both of the glass panes 2 and of the insulating glazing unit 1;
- washing of the individual glass panes, with an alternation of inner pane/outer pane (the orientation being the one defined earlier);

application of the spacer frame: the spacer frame 3 manufactured beforehand, filled with hygroscopic material 4 that is intended to absorb the moisture incorporated within the chamber during the manufacturing process and any moisture that might penetrate subsequently, and covered on its lateral faces with a thermoplastic sealant 5 which has tightness-providing functions, in machines that are external with respect to the production line of the insulating glazing unit 1, is applied to one of the panes, typically the second one, that constitute the insulating glazing unit 1 in an appropriately provided station of the line for production of the insulating glazing unit 1;

filling with gas, mating and pressing of the assembly of the panes 2 and the frame (frames) 3.

Second sealing of the assembly of the components: glass panes 2, spacer frame (frames) 3, at the perimeter.

One of the most widespread solutions for replacing the air of a glazing unit with a gas that has superior thermal insulation properties, with reference to FIGS. 2 and 10, is to perform the process during the step for mating the glass panes 2 and the spacer frame or frames 3 (in the case of multi-chamber insulating glazing units). This occurs, as is known, in the machine commonly known as "coupling/pressing section with gas filling". Such machine is constituted substantially by two beds which are slightly inclined with respect to the vertical plane, one bed 21 being fixed and aligned with the conveyors for conveying the glass panes 2 and the insulating glazing unit 1 and the other bed 22 being movable along a direction z1 that is perpendicular to such beds. The movable bed, provided with a row of suckers that are distributed over the entire bed, approaches the fixed bed, where the first glass pane 2 had been positioned earlier until it rested, even forcefully so as to strengthen them, against such glass pane and capture it by means of the activated suckers. The movable bed is then moved away from the fixed bed, and with it, the first glass pane until a space equal to the space occupation of the second glass pane that includes the spacer frame 3, which adheres to the pane by way of the first butyl sealant, plus the amount of a gap that is designed for the subsequent inflow of the gas, is cleared. Such frame adheres to the pane by way of the first, butyl sealant, plus the amount of a gap that is designed for the subsequent inflow of the gas. As the second glazing unit, which is indeed provided with a spacer frame, it is arranged by means of the conveyors on the fixed bed, suitable known mechanisms approach the manifold to introduce the gas at the base of the elements that constitute the insulating glazing unit 1 and other likewise known mechanisms provide two vertical sealing barriers at the sides of the elements that constitutes the insulating glazing unit 1, albeit with a non-rectangular shape. Then the gas is injected, and then the movable bed 22 closes toward the fixed bed 21, providing the coupling of the glass panes 2 and of the spacer 3 and simultaneous pressing. In this manner, the gas remains trapped within the insulating glazing unit 1. Thereafter the evacuation of the insulating glazing unit 1 that contains the gas other than air begins; in the case of an insulating glazing unit 1 constituted by more than two glass panes 2 (typically three) and more than one spacer frame 3 (typically two), the machine, before evacuating the insulating glazing unit 1, composed as in the steps described above, performs an additional cycle, i.e., the movable bed reopens, as mentioned above, waits for the arrangement of a third glass pane 2 provided with a second spacer frame 3, approaches it, as mentioned above, and after insertion of the gas it performs a second coupling and a second pressing. The procedure can be repeated in the case of quadruple glazing, et cetera.

The process described above can be performed by the respective machine automatically or semiautomatically.

The prior art regarding the field and describing machines and methods for filling an insulating glazing unit 1 with a gas other than air, does not appear to lead to a fully satisfactory solution for correct filling with gas in the case of glass panes 2 that are not sufficiently planar.

This aspect of the non-planarity of the glass panes 2 therefore constitutes one of the greatest current problems in the fabrication of glazing units with commercially available machines, since it compromises their results as regards the concentration of contained gas and the gas consumption. While inexpensive argon gas was used predominantly in the past, currently, in order to achieve far more efficient thermal insulations, more expensive gases, such as krypton and xenon, are used, and therefore the waste of gas during the filling step is no longer affordable (if the cost of argon is 1, krypton and xenon respectively cost 100 and 400).

Prior documents belonging to the background art pertinent to the invention comprise:

EP0674086 B2 and corresponding similar EP0674085 B1 and EP0674087 B1, in the name of Lisec Peter, related to a method and a device for filling the insulating glazing unit with a gas other than air through its lower edge 1*d* by resorting to a particular configuration for the seal against the edges of the glass panes and for injecting gas (parallel to the beds of the coupling/pressing/gas filling section);

WO 2006/002975 A1, in the name of Lenhardt Karl, related to a method and a device for filling the insulating glazing unit with a gas other than air through its lower edge 1*d* by resorting to a particular configuration for the seal against the edges of the glass panes and for injecting gas (at right angles to the beds of the coupling/pressing/gas filling section).

The background art available does not solve the problem related to the non-planarity of glass panes. It is also not helpful with reference to the possibility to fill the insulating glazing units 3, whose glass panes 2M and 2*m* that compose them are not aligned along the base 1*d*.

SUMMARY OF THE INVENTION

The aim of the present invention is to provide a device and a method for filling insulating glazing units composed of at least two glass panes and at least one spacer frame with a gas other than air that require no manual intervention or adjustments made by an operator.

Within this aim, an object of the present invention is to provide a method and a device that allow to fill the insulating glazing unit with a gas other than air in a fully mechanized and efficient manner even if one or more of the glass panes 2 lacks a sufficiently precise planarity, and also in the case of an insulating glazing unit 1 that is composed of glass panes 2M and 2*m* that are not aligned at the lower edge 1*d*, without problems.

Another object of the present invention is to provide a device that is obtainable with means easily available on the market and at competitive costs.

This aim and these and other objects, which will become better apparent hereinafter, are achieved by a device having the features set forth in claim 1 and by a method with the steps set forth in claim 7.

In an advantageous aspect thereof, the invention provides the lower part of the fixed bed 21 with a series of retractable suckers, which by interacting adequately with the lower flap 1*d* of the glass pane 2 before, during and after the step for injecting gas, optimize the flow of such gas, avoiding situations of asymmetry, occlusion and most of all of triggering of partial vacuum fields which would entail the suction of air as well as turbulent conditions that would prevent the expulsion of air from the chamber constituted by the glass panes 2, by the spacer frame 3 and by the corresponding upper slot. Further, a belt transfer device arranged at the fixed bed 21 is provided with adjustability along the vertical plane and likewise a gas distribution device located at the movable bed 22 is provided with adjustability along the vertical plane in order to allow the provision of insulating glazing units 1 in which the corresponding panes 2M and 2*m* are not aligned along the base 1*d*.

BRIEF DESCRIPTION OF THE DRAWINGS

Further characteristics and advantages of the invention will become better apparent from the following detailed description of a preferred but not exclusive embodiment thereof, illustrated by way of non-limiting example in the accompanying drawings, wherein:

FIG. 1A normal; FIG. 1B triple glazing unit; FIG. 1C laminated outer pane, low-emissivity inner pane; FIG. 1D tempered reflective outer pane, laminated low-emissivity inner pane; FIG. 1E laminated and stepped outer pane, low-emissivity inner pane (protruding part not treated with a spatula); FIG. 1F staggered laminated outer pane, low-emissivity inner pane (protruding part treated with a spatula); FIG. 1G like FIG. 1A, but with the indication of the containment of gas 7; FIG. 1H like FIG. 1E, but with the indication of the containment of gas 7; FIG. 1I like FIG. 1A, but with a spacer profile made of expanded synthetic material. FIGS. 1A-1H illustrate, more particularly, the spacer frame 3 in its hollow transverse cross-section filled with hygroscopic material 4. The two types of sealant used are highlighted: with closer hatch, the first, butyl sealant 5, which has the function of an initial bond among the components and of a seal both against the penetration of moisture and against the escape of the gas other than air, applied between the lateral surfaces of the spacer frame 3 and the panes 2, in more spaced hatch the second, polysulfide or polyurethane or silicone sealant 6, which has a mechanical strength function and sometimes, depending on the type of sealant, also as a seal with respect to the penetration of moisture and against the escape of the gas other than air, applied between the outer surface of the spacer frame 3 and the faces of the glass panes 2 up to the edge of the glass panes 2 or to the edge of the smaller glass pane 2*m*. FIGS. 1G and 1H illustrate the solutions in which the chamber is filled with gas 7. In the situations of FIGS. 1C, 1D, 1E, 1F, 1H, the glass panes 2, not being sufficiently planar, the present invention is the solution for correct filling with gas other than air, wherein the background art is instead inadequate.

The inner/outer orientation is identified visually with icons that represent the sun (outer side) and the radiator (inner side). The FIGS. 1A-1I show that the insulating glazing unit 1 can have several shapes and that the machines for introducing the gas must not only fill insulating glazing units that are not perfectly planar but also work with insulating glazing units composed with any type of spacer frame 3 and be complementary to the shape of the edge.

Figure 2:
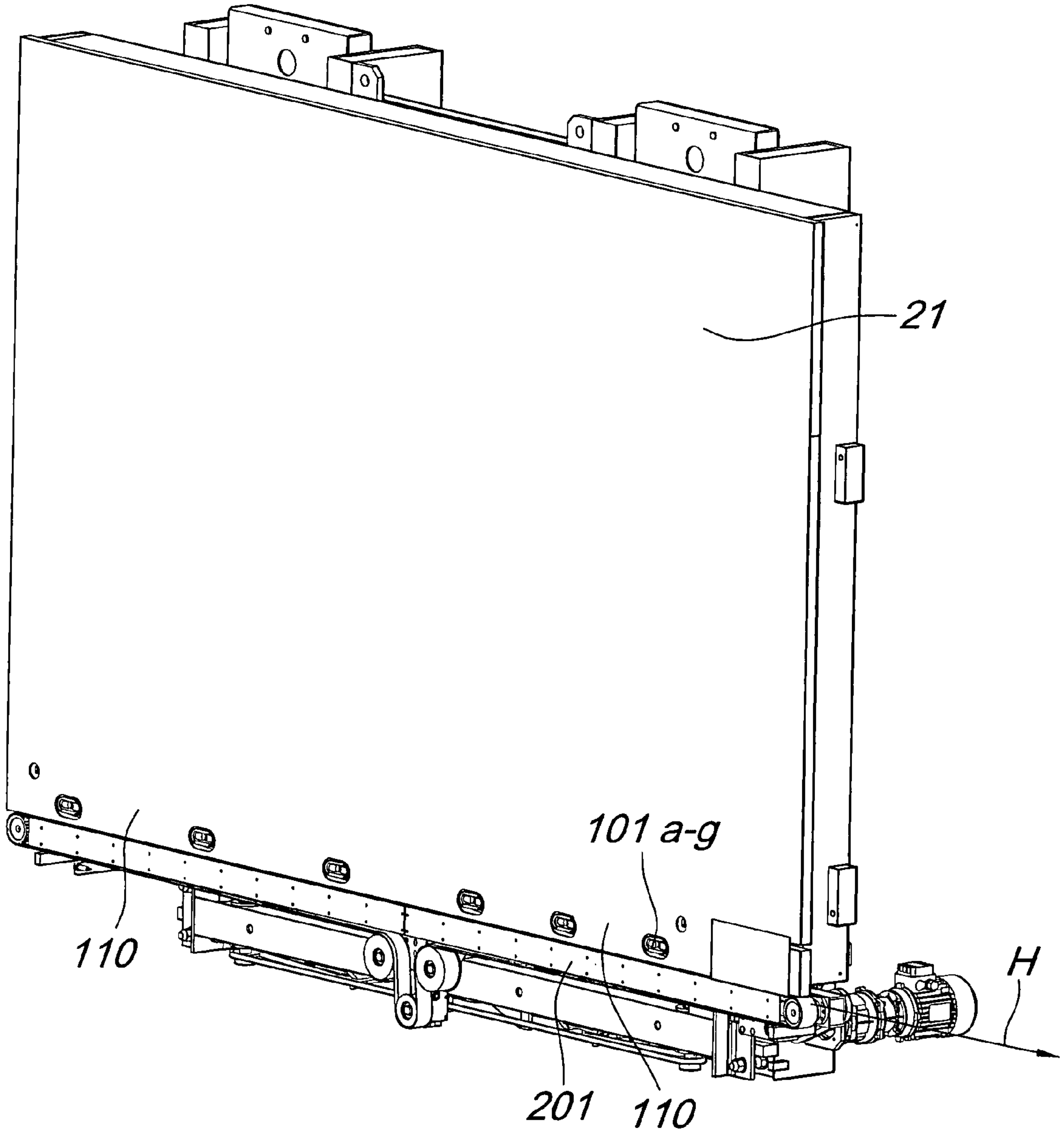

FIG. 2 is a front perspective view of the fixed bed 21 of the coupling/pressing/gas filling section, showing a row (plurality) of retractable suckers 101*a-g*, and part of the sealing system 201 between the manifold and the lower edge or bottom 1*d* of the insulating glazing unit 1, in a perspective view, the known parts of the machine being not numbered, since they are extensively already described in detail in the prior art documents mentioned earlier, and are in any case referenced in FIG. 10.

Figure 3:
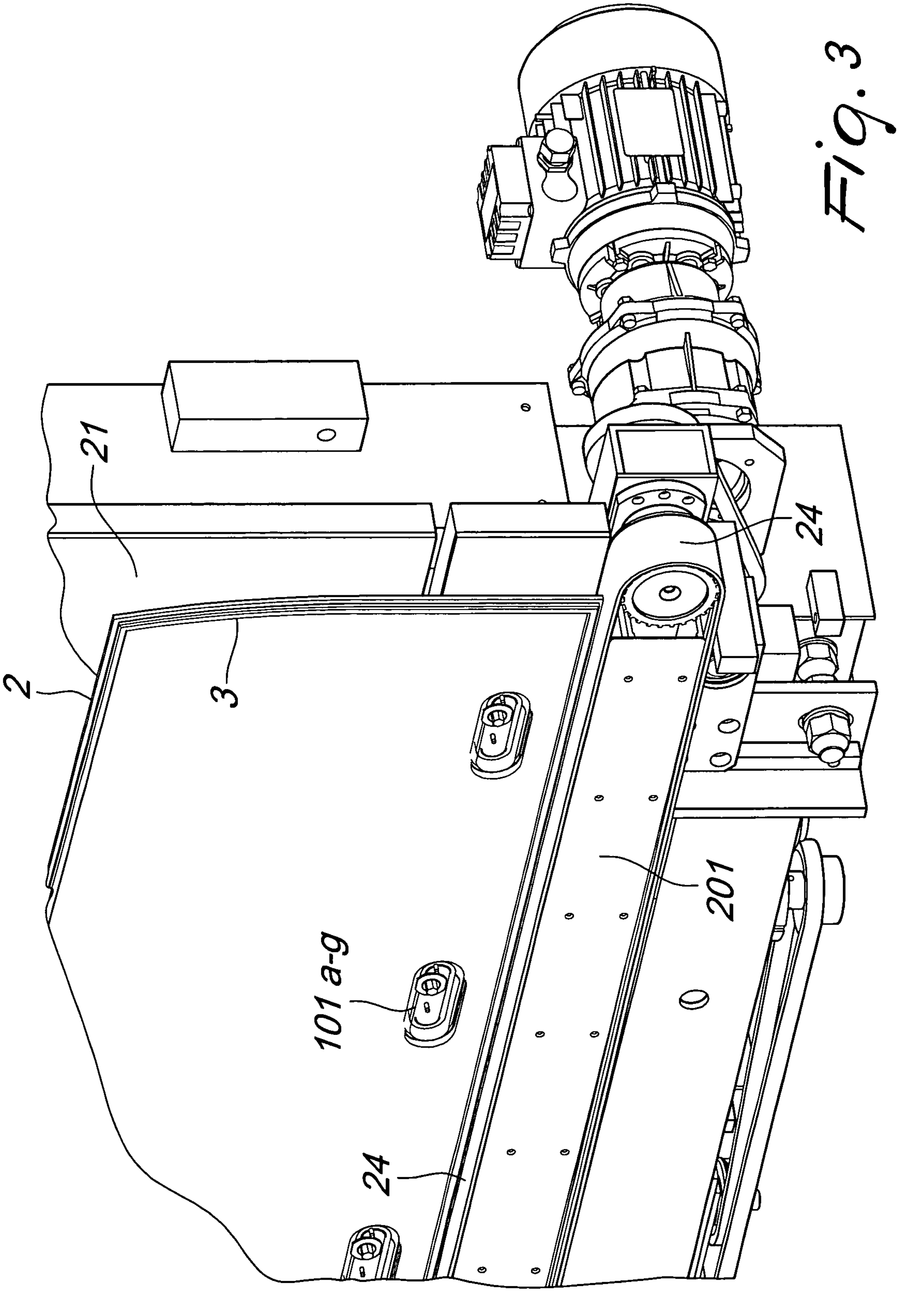

FIG. 3 is a perspective view of a detail of FIG. 2, illustrating the straightening effect performed by the row of retractable suckers 101*a-g* on the lower edge flap of the glass pane 2.

Figure 4:
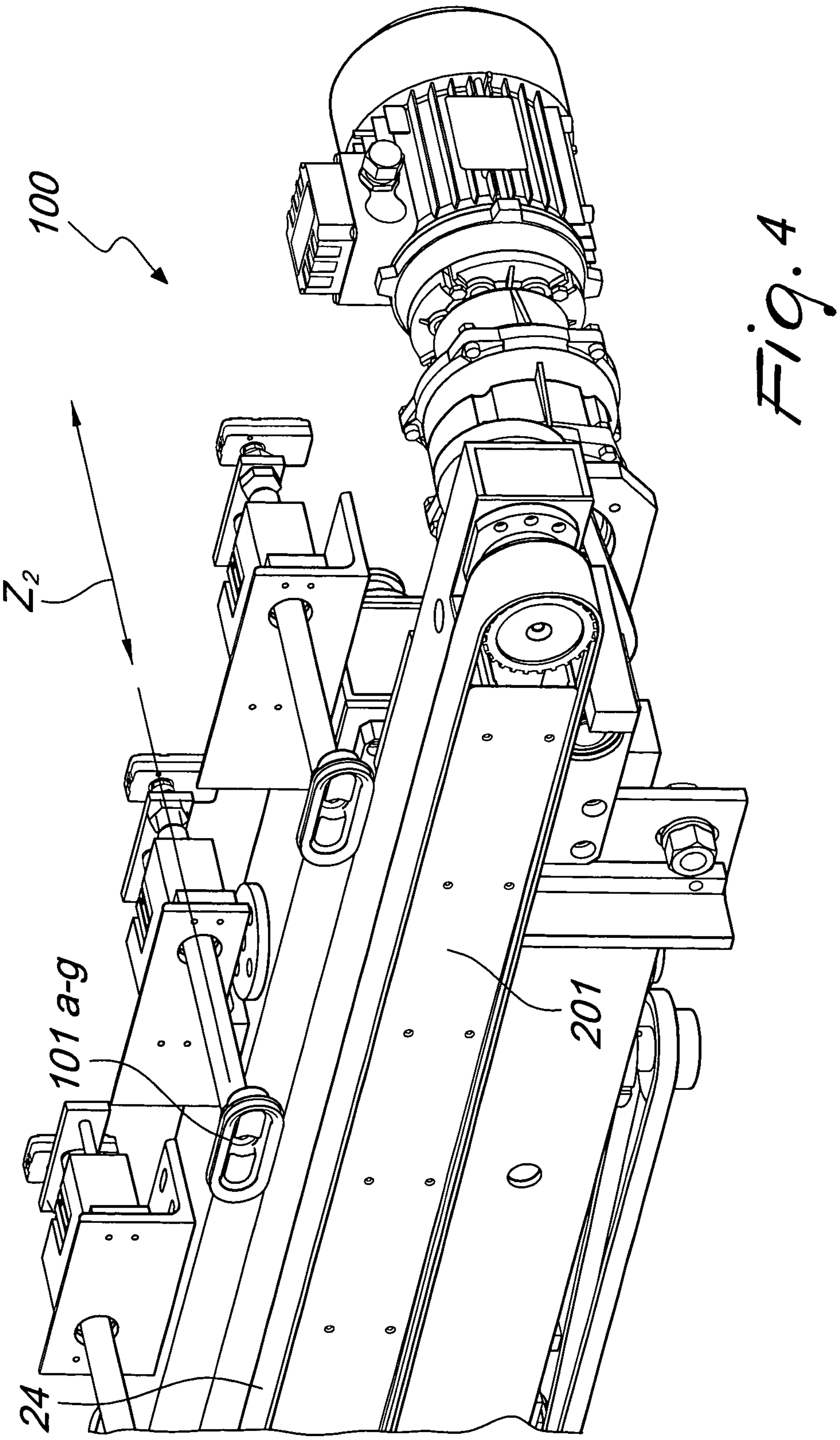

FIG. 4 is a perspective view of a detail of FIG. 2, illustrating the mechanisms that actuate the movement of the row of retractable suckers 101*a-g* along the axis z2 that is perpendicular to the fixed bed 21 of the coupling/pressing/gas filling section and illustrating the belt conveyor 24.

Figure 5:
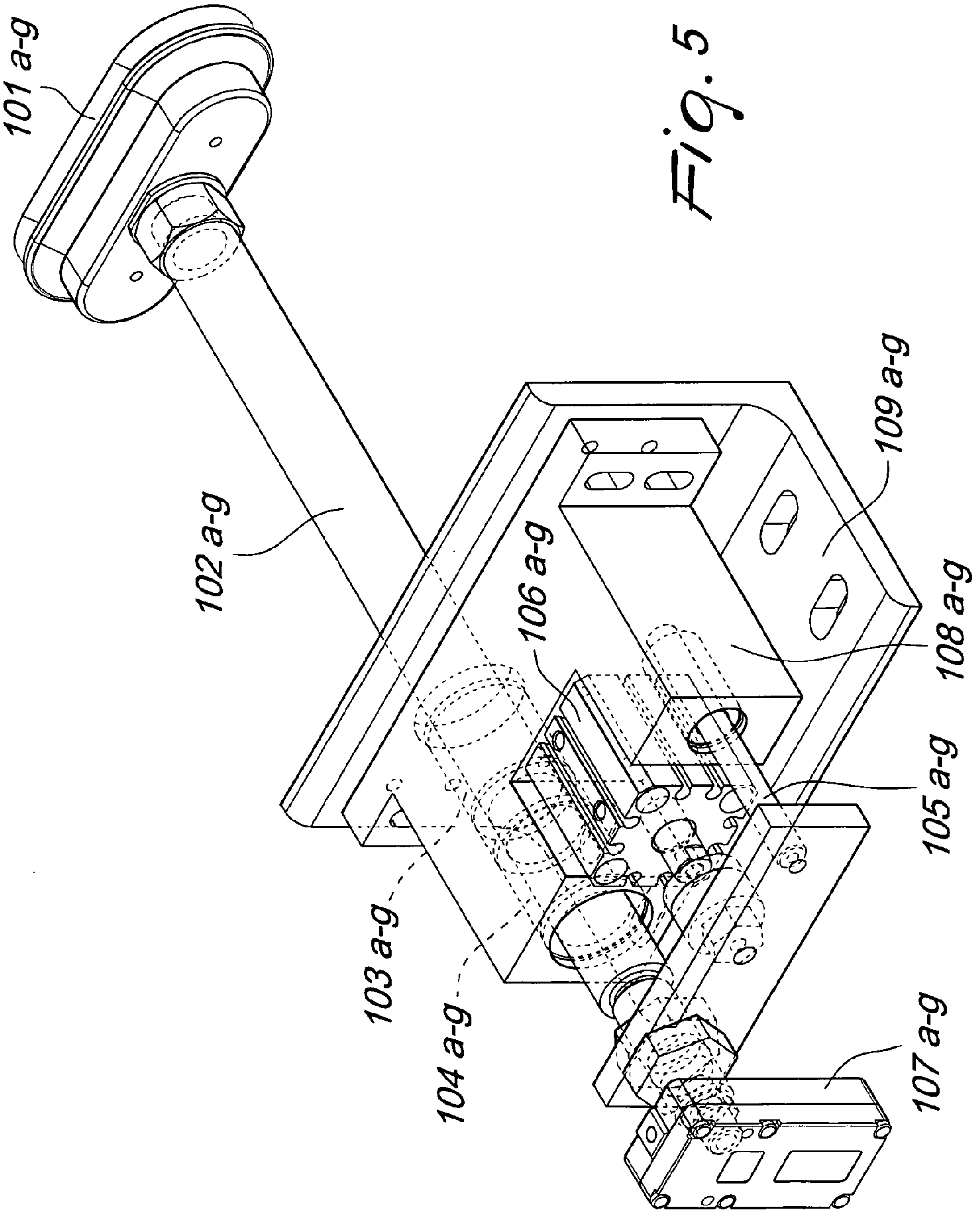

FIG. 5 is a rear perspective view of one of the suckers of the sucker row 101*a-g*, complete with the components such as the supporting bar 102*a-g* for the suckers 101*a-g*, the bar guide with ball bearing sleeves 103*a-g* and 104*a-g*, the rotation preventing device 105*a-g*, the pneumatic actuator 106*a-g* for the suckers 101*a-g*, the ejector 107*a-g* for generating vacuum, and the body 108*a-g* with the receptacles and the supporting bracket 109*a-g*, all to obtain the independent retraction movement of each individual sucker 101*a-g* along the axis z2 that is perpendicular to the fixed bed 21 of the coupling/pressing/gas filling section and generate the partial vacuum thereon.

Figure 6:
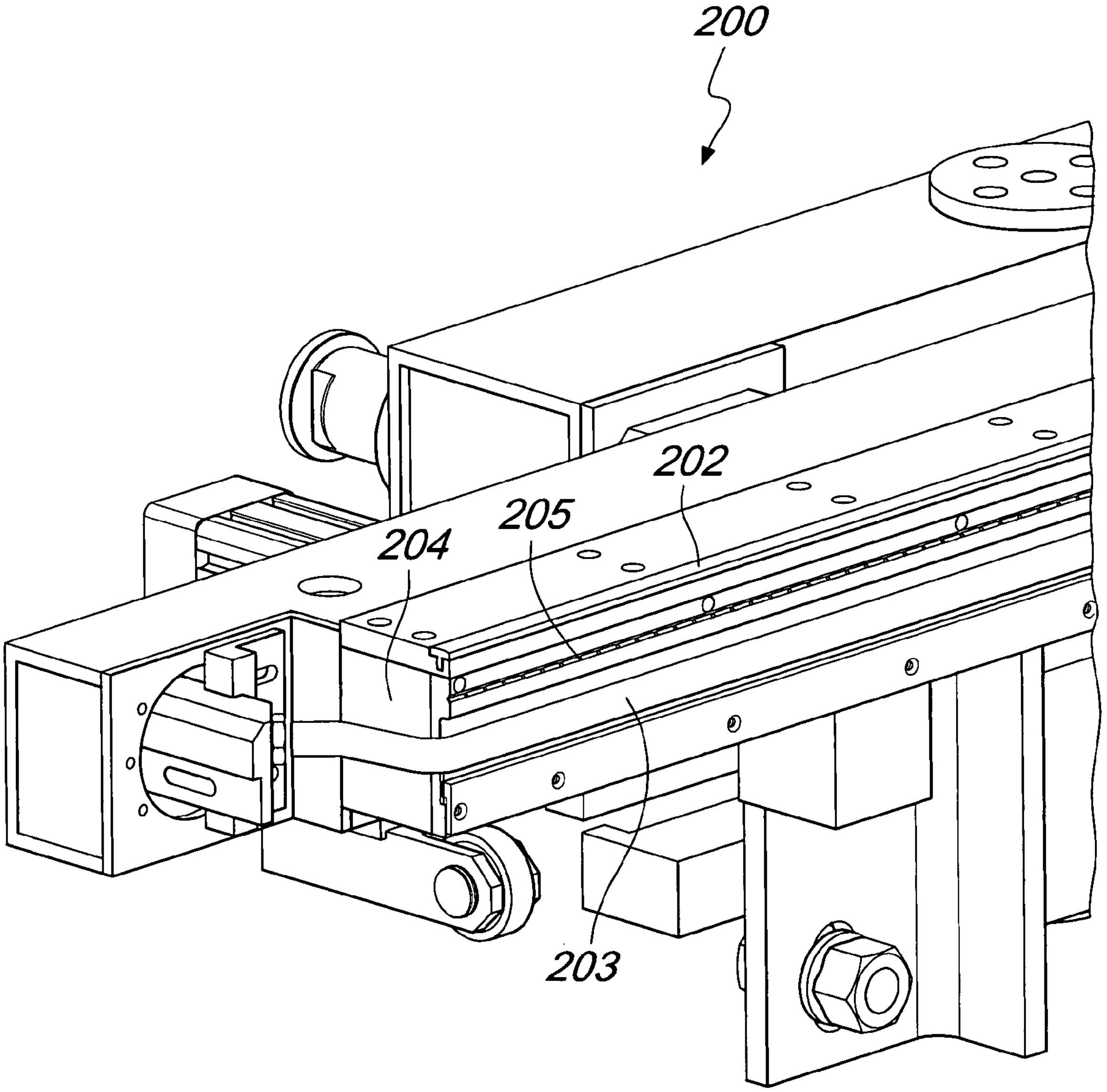

FIG. 6 is a perspective view of a detail that lies opposite the one of FIG. 2, showing the system of seals 202, 203 and the manifold 204 provided with fine perforations 205.

Figure 7:
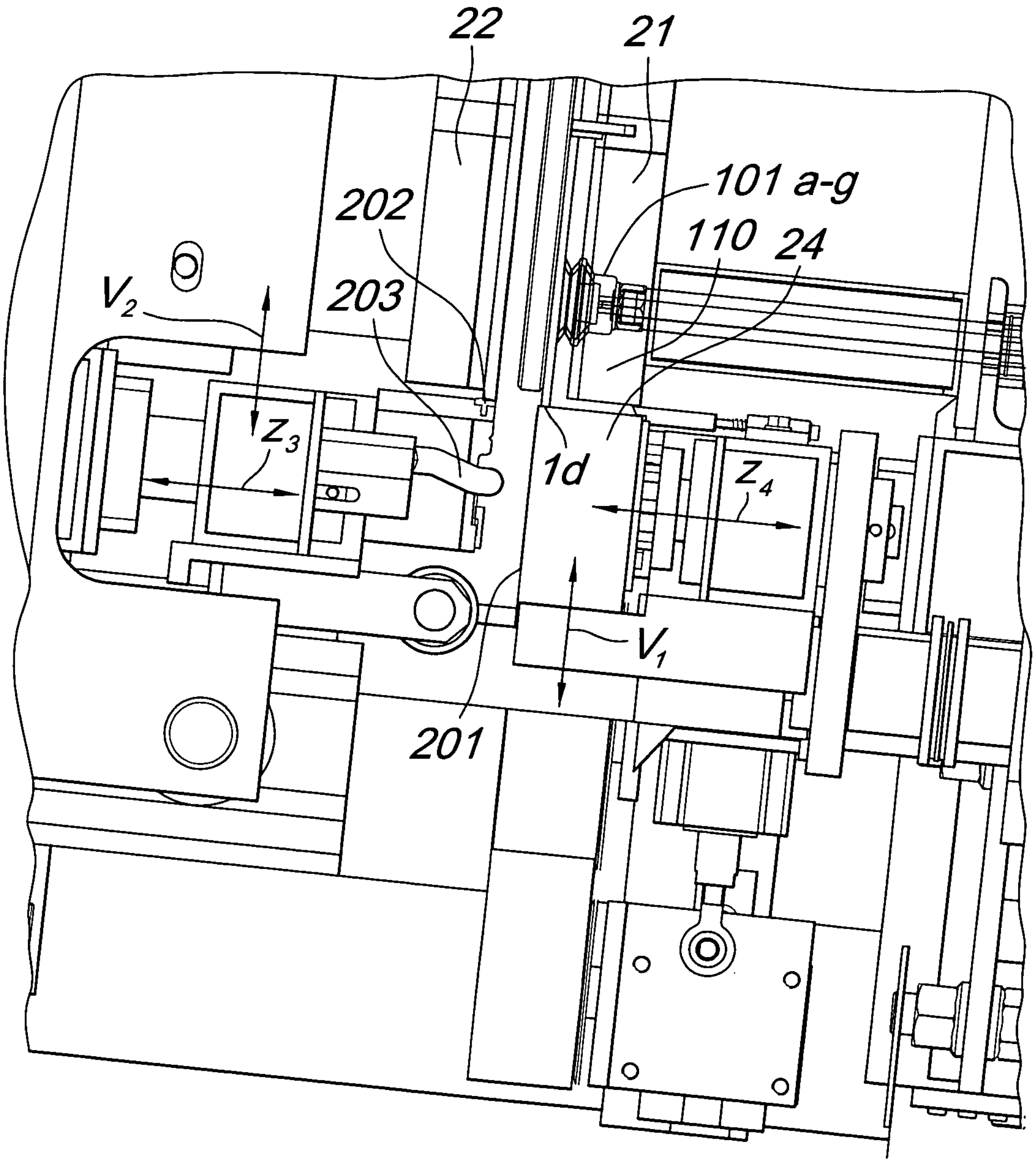

FIG. 7 is a sectional view of the device of FIG. 2, taken transversely to the plane of the insulating glazing unit 1 and therefore to the fixed bed 21 and the movable bed 22 of the machine, showing the interaction among the components of the machine, such as the row of retractable suckers 101*a-g* and the sealing system 201, 202, 203, and the lower edge 1*d* of the insulating glazing unit 1 during the step in which the second non-planar glass pane is positioned.

Figure 8:
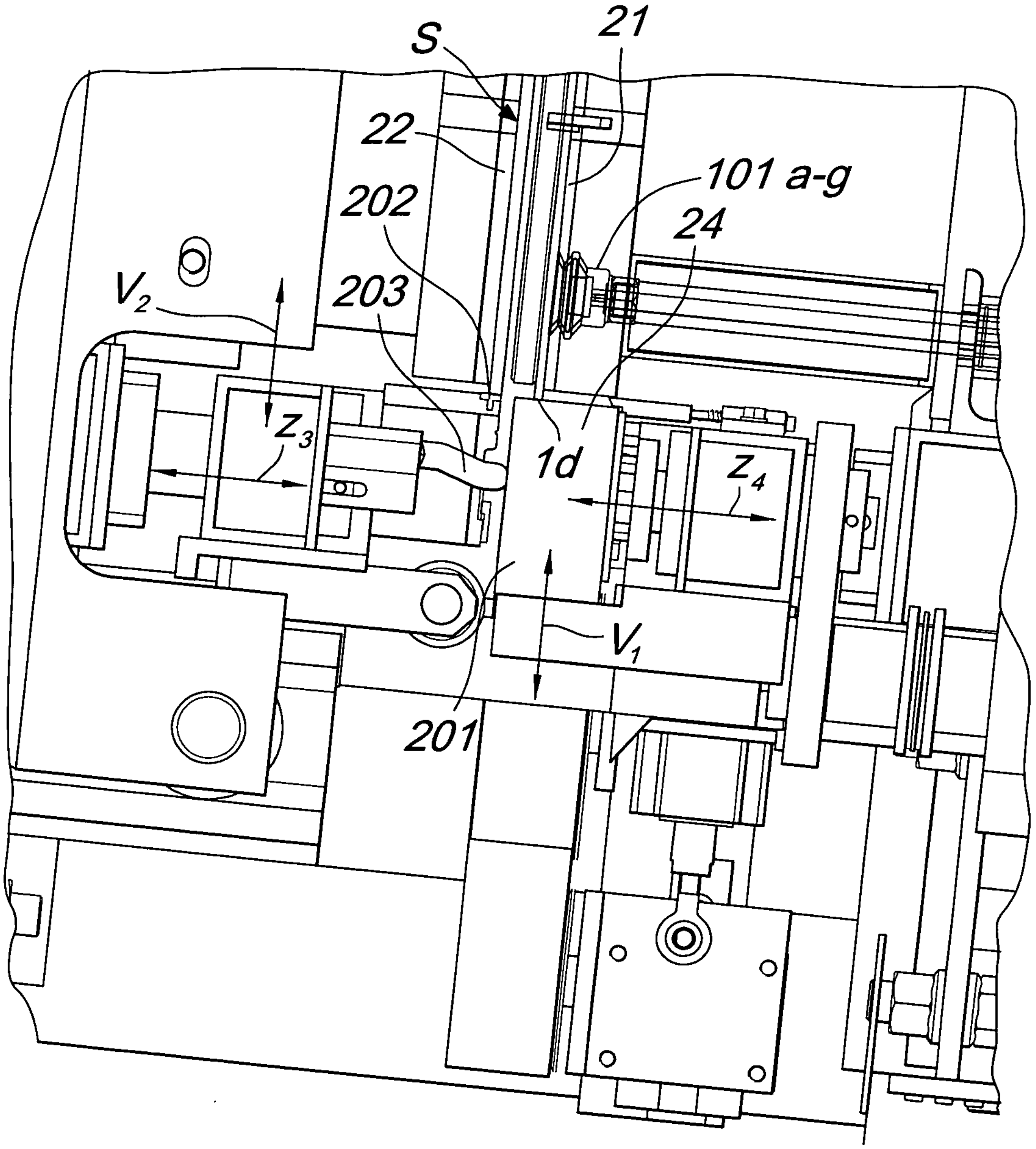

FIG. 8 is a transverse sectional view of the device of FIG. 2, taken transversely with respect to the plane of the insulating glazing unit 1 and therefore with respect to the fixed bed 21 and the movable bed 22 of the machine, showing the interaction among the components of the machine, such as the row of suckers 101*a-g* and the sealing system 201, 202, 203, and the lower edge 1*d* of the insulating glazing unit 1 during the step for straightening the non-planar glass pane and throughout the gas injection step.

Figure 9:
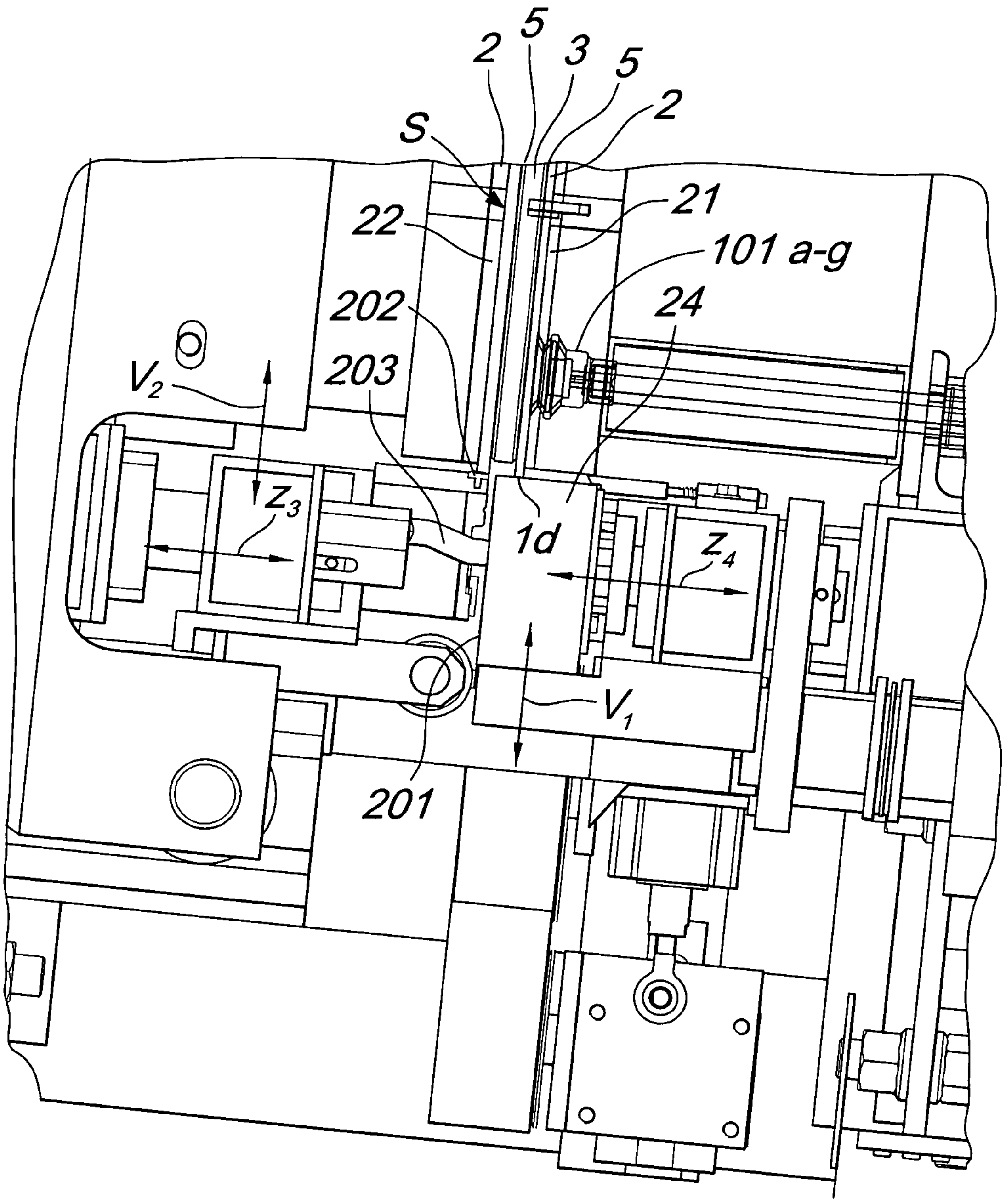

FIG. 9 is a sectional view of the device of FIG. 2, taken transversely with respect to the plane of the insulating glazing unit 1 and therefore with respect to the fixed bed 21 and the movable bed 22 of the machine, showing the interaction among the components of the machine, such as the row (plurality) of suckers 101*a-g* and the sealing system 201, 202, 203, and the lower edge 1*d* of the insulating glazing unit 1 during the step for pressing the components of the insulating glazing unit 1, such as the glass panes 2 and the spacer frame 3 or rather of the butyl sealant 5 spread onto its lateral faces.

Figure 10:
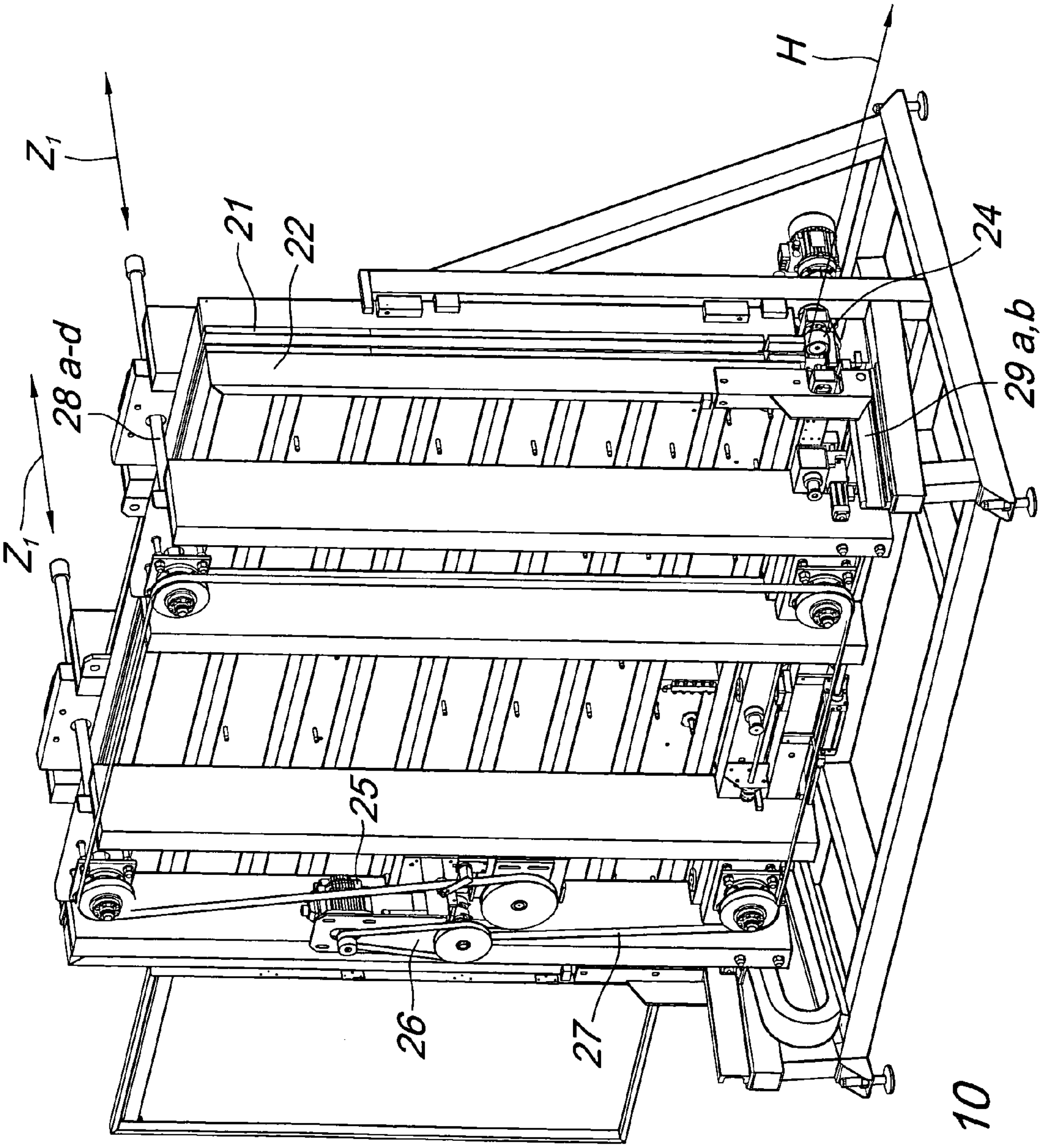
Figure 11:
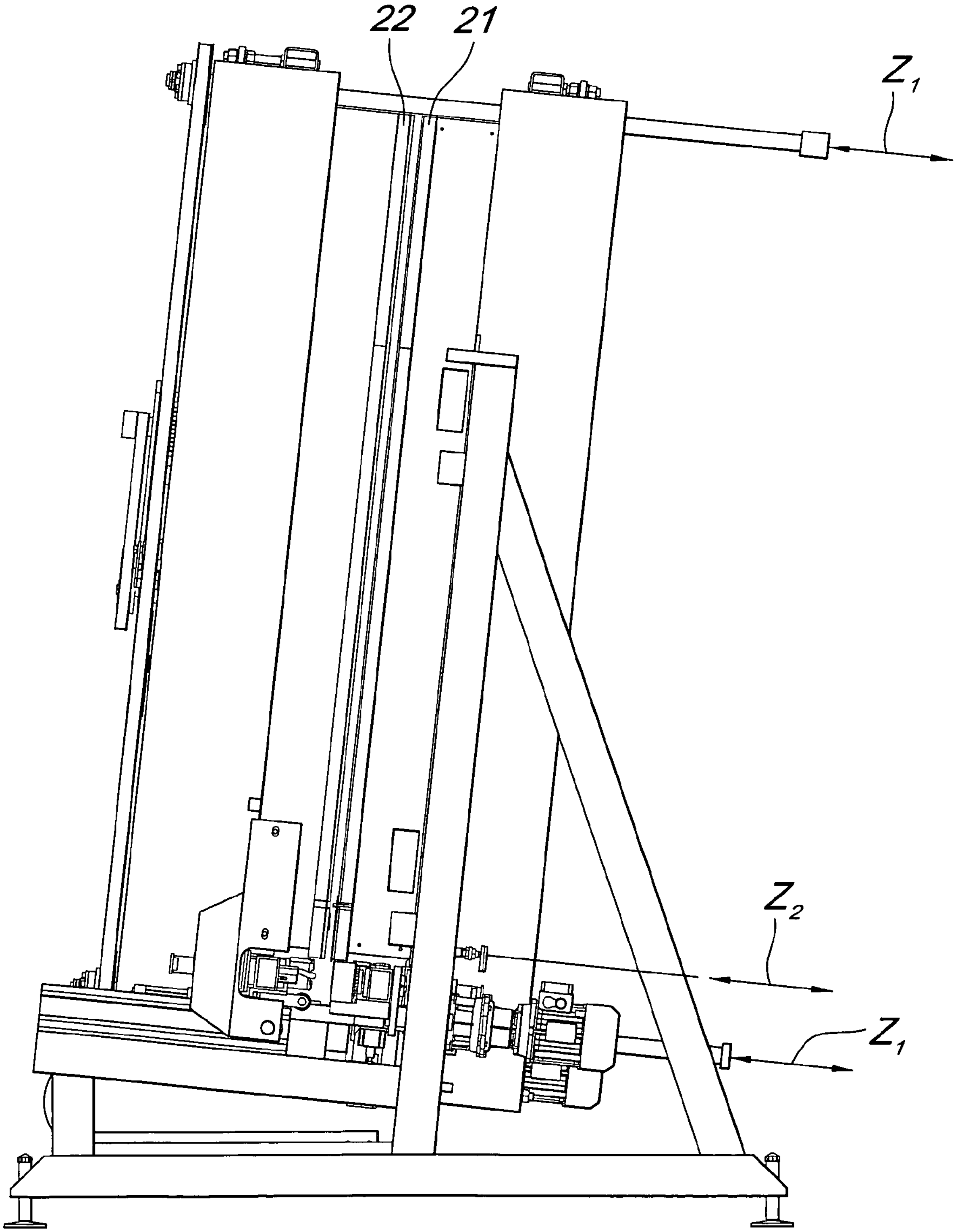

FIGS. 10 and 11 are views of the complete machine, mainly for its parts known in the main views: respectively, an overall perspective front view, indicating the horizontal axis H of movement of the insulating glazing unit performed by the lower part of the conveyor partly with rollers 23 (in the input and output conveyors 15) and partly with a belt 24 (in the coupling/pressing/gas filling section); a general side view, illustrating the transverse axes, respectively z1 for the movement of the movable bed 22 and z2 for the movement of the row of suckers 101*a-g* of the fixed bed 21; in particular, the front view shows the known mechanisms for moving the movable bed 22 with respect to the fixed bed 21 along the axis z1, which consist of the synchronous motor 25, of the intermediate transmission 26, of the main transmission 27 and of the ball bearing nut/screw assemblies 28*a-d*, and of the pair of supporting guides 29*a,b*, which in any case have a role, the only one known but as a function of coupling/pressing section, of straightening the first glass pane (but not the subsequent ones in the gas outflow step, for which the present invention intervenes).

Figure 12A:
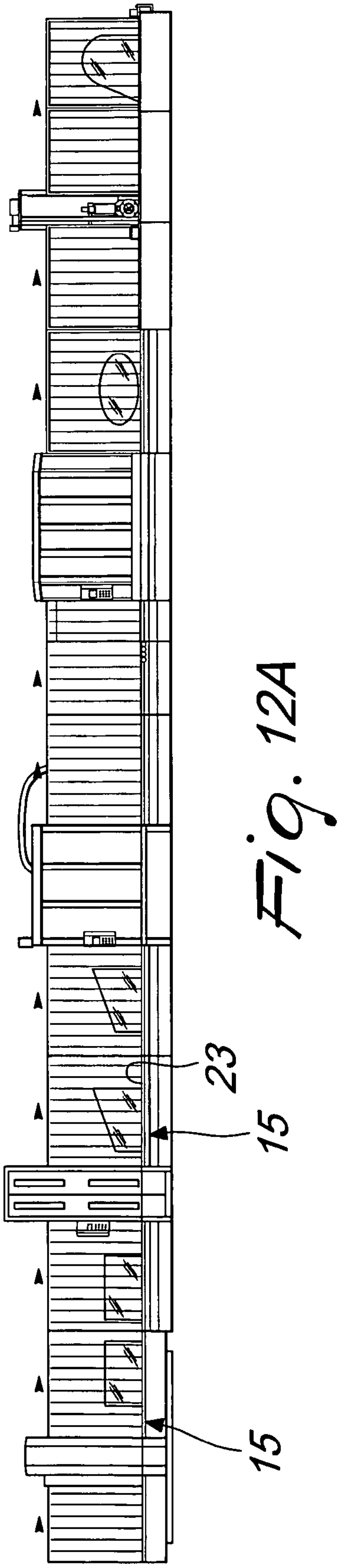
Figure 12B:
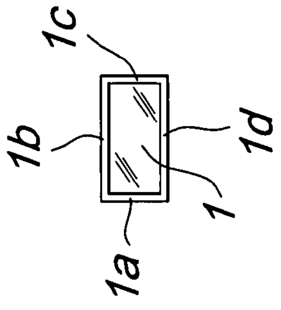

FIG. 12A is a view showing a work line with insertion of the devices according to the present invention and of the automatic coupling/pressing/gas filling machine 10 in the line for production of the insulating glazing unit 1 (shown in a perspective view, which does not comprise: the electrical/electronic panel, the control post and the protection devices).

FIGS. 12B to 12E show profiles of insulating glazing units that can be worked with the device according to the invention.

Figure 13:
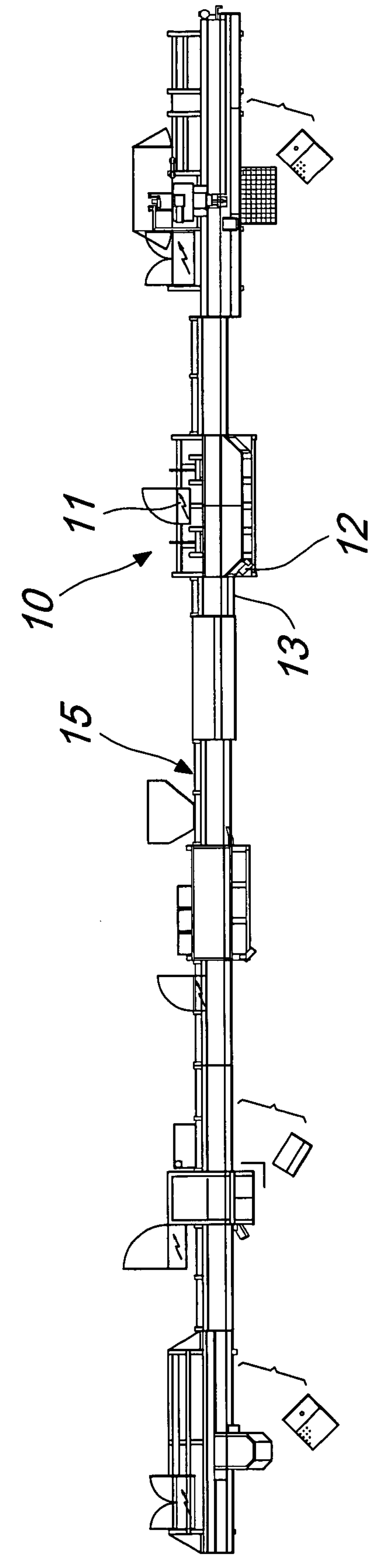

FIG. 13 is a view of an example of insertion of the devices according to the present invention and of the automatic coupling/pressing/gas filling machine 10 in the line for production of the insulating glazing unit 1 (a plan view which includes: the electrical/electronic panel 11, the control post 12 and the protection devices, generally designated by the reference numeral 13, be they of the type of mechanical protections or optical barriers or laser barriers or electrically sensitive mats, et cetera, since particular attention is given not only to the functional, qualitative, productive aspects of the content of the present invention but also to the aspects related to accident prevention). The electrical panel 11 and the post 12 differ from the ones according to the background art in the implementation of all the controls and actuation systems needed to operate the devices of the series 100 and of the series 200 according to the present invention.

DESCRIPTION OF THE PREFERRED EMBODIMENTS

With reference to the figures, the criterion used in the numbering has been the following: the products, an insulating glazing unit 1, a glass pane 2, a spacer frame 3 are designated by single-digit numerals. In particular, in order to distinguish the various possible shapes of the insulating glazing unit 1, the reference numeral 1 designates the rectangular shape, the reference numeral 1' designates the polygonal shape, the reference numeral 1" designates the curvilinear shape, and the reference numeral 1''' designates the mixed shape (see FIGS. 12B-12E).

The known components of an automatic coupling/pressing/gas filling machine 10 are designated by numbering with two digits and are not all consecutive being distributed in ranges of tens.

Main components of the invention are generally indicated in the series 100 and 200 and have therefore three-digit numbering.

For the purposes of the present description and definition of the invention it will be noted that when reference has and will be made to "substantially vertical", this was and shall be understood to mean "slightly inclined with respect to the vertical"; the conveyance of the insulating glazing unit 1 in fact occurs on conveyors whose resting surface is inclined by approximately 6° with respect to the vertical plane, and likewise the rollers or other lower supporting/transport elements have their axis inclined by approximately 6° with respect to the horizontal plane; likewise, when reference has and will be made to "substantially horizontal", this was and shall be understood to mean "slightly inclined with respect to the horizontal".

Thus "slightly inclined" will be understood as meaning inclined by no more than approximately 6° with respect to the vertical/horizontal plane.

The terms "lower", "upper", "bottom" and "side" refer to the position of the various parts herein disclosed as they are shown in the figures.

First, the known part of the automatic coupling/pressing/gas filling machine 10 (summarized hereinafter by the term "press" alone), i.e., the part that leads to coupling, filling with gas and pressing of the components of the insulating glazing unit 1, is described.

The first one of the two glass panes 2 that arrives from preceding processes performed in the vertical production line of the insulating glazing unit 1 and described in summary earlier, conveyed by conveyors 15 with a substantially vertical arrangement, enters the press body, where it is supported and conveyed by support and conveyance means constituted, in an embodiment by a belt conveyor 24, and rested against a first, substantially vertical fixed bed (actually inclined by 6°) 21, which is generally and diffusely provided with a series of holes that feed air, so as to produce gliding against the bed 21, assisted by an air cushion. Known slowing and stopping sensors act on the motor that actuates the advancement and position the glass pane 2 in a specific point of the bed 21, as shown in FIG. 3.

At the end of this operation, a second, movable bed 22 (see FIG. 10), which was sufficiently spaced from the fixed bed 21 to allow the entry of the first glass pane 2, by way of the action of a motor 25, of mechanical transmissions 26 and 27 and of ballscrews 28*a-d*, closes against the fixed bed 21, until the glass pane 2, which is generally not flat, is rendered flat, since in this condition the function of the fixed and movable beds 21, 22 is to press, by virtue of the partial vacuum activated on fixed suckers S of a known type, distributed on the movable bed 22, the first glass pane 2 is captured and retained by the movable bed 22 with its fixed suckers S, which then moves away from the fixed bed 21 by way of the reverse action of the motor 25, thus leaving space to introduce additional components of the insulating glazing unit 1.

At this point, the second subsequent glass pane 2, provided with the spacer frame 3, which in turn arrives from the previous processes performed in the vertical line for production of the insulating glazing unit 1, conveyed by the conveyors 15 with a substantially vertical arrangement, enters the press body, where it is supported and conveyed by the belt conveyor 24 and rested against the vertical fixed bed 21 with an air cushion. The slowing and stopping sensors act on the motor that actuates the advancement and position the second glass pane 2 also in the same point where the preceding one had stopped.

Then the movable bed 22 and the previously captured glass pane 2 with it, again by actuation of the motor 25, approaches the fixed bed 21 and moves the glass pane 2 retained by the movable bed 22 to a distance of a few millimeters from the spacer frame 3; gas 7, fed by a manifold provided with a plurality of holes and arranged below the fixed 21 and movable 22 beds, enters through such slot. Sealing systems of a known type close a lower edge or base 1*d*, leaving it connected only to the manifold, and lateral edges 1*a* and 1*c* of the components of the insulating glazing unit 1. During the inflow of the gas 7, a horizontal upper side 1*b* remains open to vent the air.

Once introduction of the gas 7 has ended, the movable bed 22, again by way of the actuation of the motor 25, causes the glass pane 2 retained by it to move toward the spacer frame 3, coupling them and pressing them with such a pressure value as to ensure spreading of a butyl sealant 5 between the frame 3 and the glass panes 2, so as to obtain the sealing of the chamber of the insulating glazing unit 1.

The process can be repeated by adding another glass pane 2 provided with a spacer frame 3, in order to obtain the insulating glazing unit 1 with two chambers, and so forth.

We now come to the detailed description of a way of carrying out the inventive part of the present invention, i.e., the one that, combined with the traditional part described above, is capable of filling the insulating glazing unit 1 in an innovative manner with respect to the background art.

A preferred but not exclusive embodiment of the invention is the one described hereafter. For easy comprehension, reference will be made to the figures, particularly FIGS. 3 to 9, which illustrate the inventive device.

The description of the known parts of the machine 10 and of the operation method was given earlier. The inventive parts are shown superimposed on such known parts and mainly, but not exclusively, regard:

a) devices for straightening the glass panes 2 subsequent to the first one;

b) devices for providing the front seal;

c) devices for stepping the bases 1*d* of glass panes 2M and 2*m*.

The method steps relating to the operation of such devices are also disclosed.

Figure 1A:
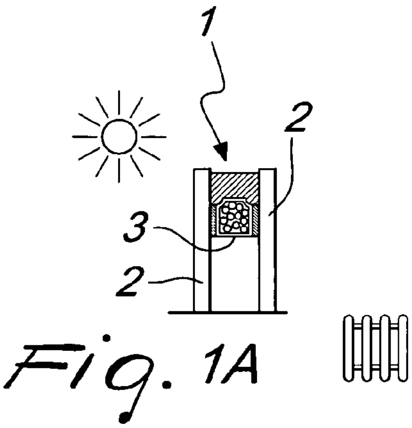
FIGS. 1A to 1I are schematic views of the peripheral portion of the insulating glazing unit 1 in a non-limiting exemplifying series of possible combinations.
Figure 1B:
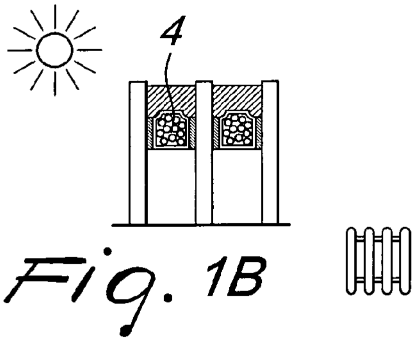
Figure 1C:
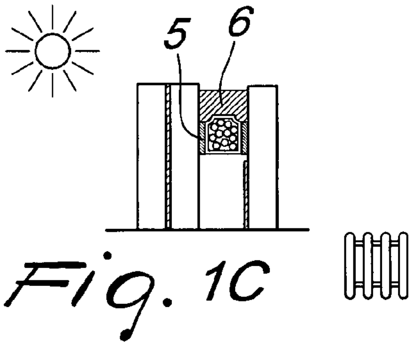
Figure 1D:
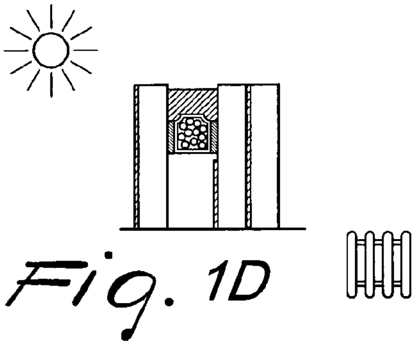
Figure 1E:
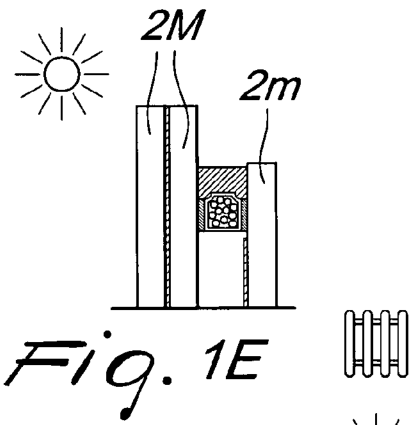
Figure 1F:
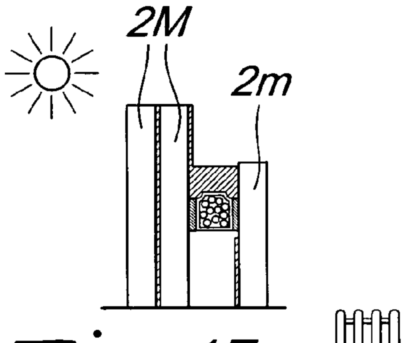
Figure 1G:
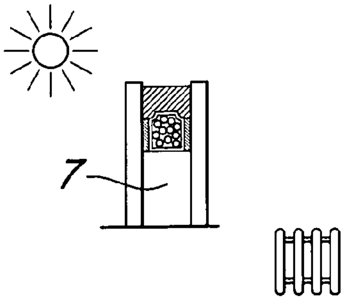
Figure 1H:
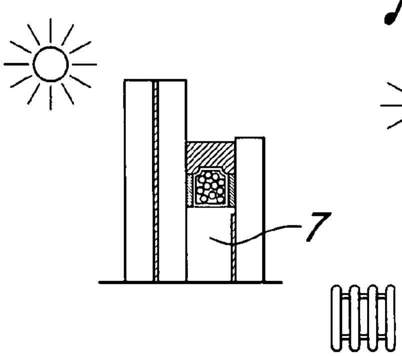
Figure 1I:
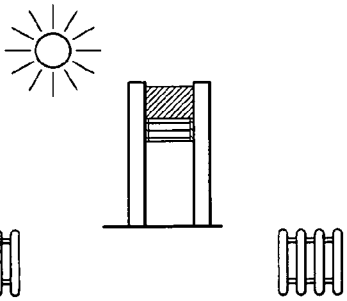

A detailed description is now given with reference to the above devices and the Figures.

a) Once the second or subsequent glass pane 2 provided with the spacer frame 3 has stopped and is supported on the fixed bed 21, a plurality of suckers 101*a*-*g* provided arranged on a lower band 110 of the fixed bed 21, are actuated by low-thrust pneumatic cylinders 106*a*-*g* and the corresponding mechanisms already mentioned and described in the presentation of the figures, so as to arrange themselves against the glass pane 2 at its lower face. Subsequently, ejectors 107*a*-*g* are activated and therefore the suckers 101*a*-*g* are joined to and capture the subsequent glass pane 2. Then, the pneumatic cylinders 106*a*-*g*, this time with a high traction ratio, are actuated and the lower flap of the subsequent glass pane 2 provided with the spacer frame 3 is straightened by virtue of the retraction motion of the suckers 101*a*-*g* with respect to the movable bed 22, thus arranging the lower edge of the subsequent glass pane 2 perfectly aligned with the fixed bed 21. A consequence of this is that in the subsequent step for approach of the movable bed 22, the slot that remains free for the inflow of gas 7 can be uniformly calibrated around a value of 2 mm, which calibration was previously impossible with the devices known in the art. Moreover, by virtue of the uniformity of the slot, it allows achieving a correct flow of gas and therefore limiting turbulence, thus optimizing the concentration of gas in the chamber and the consumption of the gas. The reduction and the uniformity of the extent of such slot with respect to the ones obtainable in the background art leads to the systematic reduction of gas consumption, since a big and variable extent of such slot corresponds to an amount of gas that is wasted in any case. The residual volume when the insulating glazing unit 1 is finished is, actually, the one that corresponds to the area of the glass pane 2 multiplied by the thickness of the spacer frame 3 and not by the thickness of the spacer frame plus 2 mm (or plus at least 5 millimeters as it is usually in the background art that is needed to compensate for the non-planarity of the glass panes).

b) The front seal constituted by an inflatable tubular gasket 203 applied in a receptacle of a perforated manifold 204 (FIGS. 6-9), by way of the transverse movement of such manifold along an axis z3, performed by known mechanisms, such as supporting sliders, sliding blocks and ball bearing guides, ballscrews and gearmotors, mates with a plate 201 of the single-belt conveyor 24. The perforated manifold 204 is suitable to feed gas 7, for injection, into the chamber of the glazing unit 1, through perforations 205 thereof. The manifold 204 can be throttled, i.e. it can be selectively divided in progressive zones containing part of the perforation 205, so as to adapt to “active” gas injecting length, to the actual length of the glazing unit 1. The plate 201 is in turn provided with a transverse movement along an axis z4 so as to move the conveyor belt 24 with an adequate cantilever with respect to the fixed bed 21 in order to adapt to the thicknesses of the components of the insulating glazing unit 1. This mating is independent of the arrangements along axes V1 and V2 respectively of the belt conveyor 24 and of the manifold 204, and this allows to provide the subsequent advantage of the invention according to item c). The seals toward the margins of the lower sides 1*d* of the panes 2 are entrusted, for the pane on the fixed bed 21, to the toothed belt conveyor (the set of belt teeth being shaped and obstructed by a complementary sliding block), and to a gasket 202 for the pane 2 on the movable bed 22.

c) Starting from the configuration of item b), it will be understood that the manifold 204 and the belt conveyor 24 are provided respectively with a movement with respect to the vertical axes V1 and V2. These movements are also performed by known mechanisms, such as supporting sliders, sliding blocks and ball bearing guides, ballscrews and gearmotors, that when they are combined with the transverse movement mechanisms, respectively on axes z4 and z3, and with the inflatable tubular gasket 203 constituting the front seal, they constitute a device that allows to fill with gas even those insulating glazing units 1 of configurations as shown in FIGS. 1E, 1F, 1H that were not workable with the devices known in the background art. The known types of device in fact allow, in the same coupling/pressing/gas filling machine 10, to insert the gas only on insulating glazing units 1 in which the lower flaps, at the lower edge 1*d* of their panes 2 are aligned. In the case of misaligned flaps, they only allow the coupling and pressing operations and exclude filling with gas, indeed due to the limitation imposed by the system of seals, which are different from the ones of the present invention, such as those disclosed by EP0674082 B2 and WO2006/002975 A1.

Figure 12C:
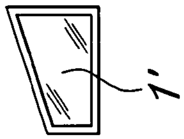
Figure 12D:
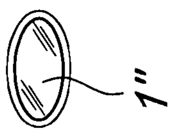
Figure 12E:
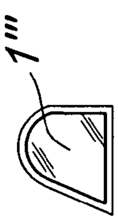

In the case of an insulating glazing unit 1 that has a contoured shape, i.e., a non-rectangular one (as shown in FIGS. 12C-12E), information related to its shape is entered electronically by means of known methods (such as keyboard, floppy disk or network) or by other new techniques, such as acquisition by means of a scanner. These contoured shapes must be entered since the process logic of the machine must know them in order to stop the glass panes in a consequent position and calculate the volume of gas to be injected.

All the movements linked to the operation steps of the fabrication cycle are advantageously, mutually interlocked with the aid of a logic system that is parallel but always active, in order to prevent, during the process, conditions of mutual interference between the actuators and the material being processed.

The present invention is susceptible of numerous constructive variations, with respect to what was described and can be deduced from the drawings, whose details are evident and eloquent for the person skilled in the art. All such variations are within the scope of the appended claims.

Thus, for example, the mechanical devices for movement and the adjustments along the axes V1, V2, z3, z4, the electronic/mechanical devices for assisting them, et cetera, the actuation means, which can be electrical, electrical-electronic, pneumatic, hydraulic and/or combined, et cetera, the control means, which can be electronic or fluidic and/or combined, et cetera, all are replaceable by other, known equivalent means.

All the details can be replaced with other technically equivalent ones. The materials and the dimensions may be any according to requirements arising in particular from the dimensions (the base and the height) and/or from shape of the insulating glazing unit.

The description and the figures referenced above refer to a fully automatic coupling/pressing/gas filling machine 10, which includes the devices according to the invention, arranged according to a left-to-right process flow as shown in the Figures. It is therefore easy to imagine a description and corresponding figures in the case of mirror-symmetrical or otherwise different arrangements, for example including variations of the direction of the work line.

In practice it has been found that the invention achieves the intended aim and objects.

Machines for automatically filling the insulating glazing unit 1 with a gas other than air have been developed according to a solution that differs from the injection of the gas during the coupling step. They act after the coupling, in order to be independent of the need for planarity of the glass panes 2. This method and the corresponding machines, albeit with excellent qualitative results in terms of concentration of gas and consumption of gas, did not turn out to be competitive in terms of cost, since they were machines working as additional devices to the coupling machine/press.

The demand for machines for filling an insulating glazing unit with a gas other than air is fastly growing by virtue of the laws imposing energy saving.

Insertion of the machine that according to the present invention in the production line of the double glazing unit as shown in FIGS. 12A and 13 is therefore clearly advantageous and required for industrial application.

The disclosures in Italian Patent Application No. TV2008A000031 from which this application claims priority are incorporated herein by reference.

What is claimed is:

1. A device for filling with gas other than air an insulating glazing unit, comprising:

at least one conveyor that supports and conveys glass panes and spacer frames composing the insulating glazing unit with an arrangement that is slightly inclined with respect to the vertical plane along a longitudinal horizontal axis that is parallel to a base of the insulating glazing unit;

a perforated manifold that can be throttled in a longitudinal extension thereof and is arranged along a base of the insulating glazing unit;

a fixed bed that constitutes an extension of the at least one conveyor and is provided with support and conveyance means;

a movable bed that is movable parallel to said fixed bed and is adapted to capture a glass pane by way of a row of suckers and to keep the glass pane at a distance from a subsequent glass pane provided with a spacer frame supported on said fixed bed for injection of gas fed by said perforated manifold;

an inflatable tubular gasket, which is arranged longitudinally to, and faces a face plate of said conveyance means, so as to provide a seal between the fixed bed and the movable bed toward the base of the insulating glazing unit suitable to allow gas filling of the insulating glaring unit; and a sealing system formed by said tubular gasket and a gasket supported on said manifold and said conveyance means formed by a belt conveyor, said manifold and conveyor belt being each movable independently of the other along at least one of: respective substantially vertical axes; and respective substantially horizontal axes.

2. The device according to claim 1, wherein said manifold and conveyor belt are each movable independently of the other along said respective substantially vertical axes and independently along said respective substantially horizontal axes.

3. The device according to claim 1, further comprising:

a series of retractable suckers that are provided and arranged adjacent said conveyor, said series of retractable suckers being configured and operated so as to capture a lower flap of the subsequent glass pane provided with the spacer frame and to perform therewith a retraction motion with respect to the movable bed suitable to straighten the lower flap of the subsequent glass pane and to align a lower edge of the subsequent glass pane with said fixed bed.

4. The device according to claim 3, wherein said retractable suckers are suitable to perform straightening action for a third glass pane when the insulating glazing unit is constituted by three glass panes and two spacer frames and for a fourth glass pane when the insulating glazing unit is constituted by four glass panes and three spacer frames.

5. The device according to claim 3, comprising mechanisms for moving said retractable suckers along an axis that comprise at least one low-thrust pneumatic actuator.

6. The device according to claim 3, comprising supporting bars passing through guide ball bearing sleeves and arranged along an axis that is perpendicular to a face of the fixed bed, said supporting bars being suitable to support the suckers loaded by the action of the weight of the glass panes complete with the spacer frame.

7. A method for filling with gas other than air an insulating glazing unit composed of at least two glass panes and at least one spacer frame, comprising:

feeding by way of at least one belt conveyor a glass pane on a support and conveyance means, between a substantially vertical fixed bed and a substantially vertical movable bed;

capturing said glass pane by way of fixed suckers provided on said movable bed;

feeding a subsequent glass pane provided with a spacer frame on said support and conveyance means so as to rest against said fixed bed;

capturing a lower flap of said subsequent glass pane by way of retractable suckers provided on a lower band of said fixed bed arranged adjacent said belt conveyor;

moving said retractable suckers along with the lower flap of said subsequent glass pane by a retraction motion with respect to said movable bed that carries out straightening of the lower flap of the subsequent glass pane to align a lower edge of the subsequent glass pane with said fixed bed; and injecting gas by way of a perforated manifold in the gas chamber formed by the glass pane and subsequent glass pane.

8. The method of claim 7, comprising, during said straightening of the lower flap of the subsequent glass pane, arranging the lower flap of the subsequent glass pane parallel to a corresponding lower flap of the glass pane captured by the movable bed, so as to provide a uniform and reduced slot therebetween for gas injection.

9. The method according to claim 7, further comprising sealing frontally said fixed and movable beds, before said injecting gas.

10. The method according to claim 7, comprising arranging a base of the glass pane and a base of the subsequent glass pane at different levels during said feeding of said glass pane and of said subsequent glass pane.

11. The method according to claim 10, comprising supporting the glass pane and said subsequent glass pane on the fixed bed or on the movable bed.

* * * * *